(12) United States Patent
Xu et al.

(10) Patent No.: US 11,982,650 B2
(45) Date of Patent: May 14, 2024

(54) METHOD FOR TESTING INTERFACIAL TRIBOCHEMICAL REACTION BETWEEN ABRASIVE AND DIAMOND WAFER

(71) Applicant: HUAQIAO UNIVERSITY, Fujian (CN)

(72) Inventors: Xipeng Xu, Xiamen (CN); Jing Lu, Xiamen (CN); Qiufa Luo, Xiamen (CN); Yueqin Wu, Xiamen (CN); Dekui Mu, Xiamen (CN); Zhiping Xue, Xiamen (CN)

(73) Assignee: HUAQIAO UNIVERSITY, Fujian (CN)

( * ) Notice: Subject to any disclaimer, the term of this patent is extended or adjusted under 35 U.S.C. 154(b) by 0 days.

(21) Appl. No.: 18/231,128

(22) Filed: Aug. 7, 2023

(65) Prior Publication Data
US 2023/0384194 A1    Nov. 30, 2023

Related U.S. Application Data

(63) Continuation of application No. PCT/CN2021/143449, filed on Dec. 31, 2021.

(30) Foreign Application Priority Data

Mar. 25, 2021  (CN) .......................... 202110323147.4
Mar. 25, 2021  (CN) .......................... 202110323211.9

(51) Int. Cl.
*G01N 3/54*    (2006.01)

(52) U.S. Cl.
CPC ....... *G01N 3/54* (2013.01); *G01N 2203/0078* (2013.01); *G01N 2203/0226* (2013.01);
(Continued)

(58) Field of Classification Search
CPC ............ G01N 3/54; G01N 2203/0078; G01N 2203/0226; G01N 2203/0298; G01N 2203/0641
See application file for complete search history.

(56) References Cited

U.S. PATENT DOCUMENTS

| | | | | |
|---|---|---|---|---|
| 5,309,754 A | * | 5/1994 | Ernst | ........................ G01N 3/42 73/81 |
| 2016/0046820 A1 | * | 2/2016 | He | ........................... C09D 5/24 252/75 |

FOREIGN PATENT DOCUMENTS

| | | |
|---|---|---|
| CN | 101314211 A | 12/2008 |
| CN | 101368012 A | 2/2009 |

(Continued)

OTHER PUBLICATIONS

V.S. Sergevnin et al., Wear and erosion of arc-PVD multilayer Ti—Al—Mo—N coatings under various conditions of friction and loading, The International Journal of Advanced Manufacturing Technology (2018) 98:593-601 (Year: 2018).*

(Continued)

*Primary Examiner* — Marrit Eyassu
(74) *Attorney, Agent, or Firm* — Cooper Legal Group LLC (57) ABSTRACT

A method for testing an interfacial tribochemical reaction between a diamond wafer and active metal abrasive or metal oxide abrasive is provided. A surface of a diamond indenter used in a nano scratch tester is coated with a layer of the active metal abrasive or the metal oxide abrasive with uniform and controllable thickness by magnetron sputtering, and an interface interaction between the layer of the active metal abrasive or the metal oxide abrasive and the diamond wafer is controlled by a scratch test of the diamond wafer. Chemical components of an interaction section on a surface (Continued)

of the diamond wafer are analyzed by the scanning probe micro Raman spectrometer.

15 Claims, 7 Drawing Sheets

(52) U.S. Cl.
CPC ............... *G01N 2203/0298* (2013.01); *G01N 2203/0641* (2013.01)

(56) References Cited

FOREIGN PATENT DOCUMENTS

| CN | 102719220 | A |   | 10/2012 |   |
|----|-----------|---|---|---------|---|
| CN | 104677783 | A |   | 6/2015  |   |
| CN | 104962234 | A |   | 10/2015 |   |
| CN | 112147040 | A |   | 12/2020 |   |
| JP | 2002283243 | A |   | 10/2002 |   |
| JP | 2014240851 | A | * | 12/2014 |   |
| WO | WO-0155695 | A1 | * | 8/2001 | ............... G01N 3/42 |

OTHER PUBLICATIONS

Yinchao Xu et al., Performance of AlTiN-and diamond-coated carbide tools in dry high-speed milling of electro discharge machining graphite, Journal of Engineering Manufacture, 2018, vol. 232(5) 766-775 (Year: 2018).*

M.T. Hernandez-Sierra et al. Tribological performance of TiN and TiCN coatings on a working tool steel, Journal of Mechanical Science and Technology 32(8)(2018) 3659-3666 (Year: 2018).*

Kaouthar Khlifi et al., Study of mechanical behaviour, deformation, and fracture of nano-multilayer coatings during microindentation and scratch test, J. Coat. Technol. Res. DOI 10.1007/s11998-015-9662-7, American Coatings Association 2015 (Year: 2015).*

Corresponding International Patent Application No. PCT/CN2021/143449, International Search Report, dated Mar. 21, 2022.

Corresponding International Patent Application No. PCT/CN2021/143449, Written Opinion, dated Mar. 21, 2022.

Zhang, B, "Formation and mechanical properties of in situ tribochemical reaction film on surface of 45 steel", Cailiao Rechuli Xuebao/Transactions of Materials and Heat Treatment, Jan. 25, 2011, vol. 32, No. 1, with English Abstract.

Kim, B.I., et al., "Chemical modification of the interfacial frictional properties of vanadium carbide through ethanol adsorption", Surface science, Jun. 2001, Issue 481, No. 1-3, pp. 185-197.

Nengyue, Yu, "Study on interfacial bonding strength of diamond abrasive in flexible polishing tools", Chinese Selected Doctoral Disserations and Master's Theses Full-Text Databases (Doctoral), Engineering Science and Technology I, Jan. 15, 2020, No. 1, pp. 1-76, with English Abstract.

* cited by examiner

METHOD FOR TESTING INTERFACIAL TRIBOCHEMICAL REACTION BETWEEN ABRASIVE AND DIAMOND WAFER

RELATED APPLICATIONS

This application a continuation of International patent application PCT/CN2021/143449, filed on Dec. 31, 2021, which claims priority to Chinese patent application 202110323147.4, filed on Mar. 25, 2021 and Chinese patent application 202110323211.9, filed on Mar. 25, 2021. International patent application PCT/CN2021/143449, Chinese patent application 202110323147.4, and Chinese patent application 202110323211.9 are incorporated herein by reference.

FIELD OF THE DISCLOSURE

The present disclosure relates to the field of ultra-precision machining of semiconductor wafers, and in particular relates to a method for testing an interfacial tribochemical reaction between abrasive (i.e., abrasive particles) and a diamond wafer.

BACKGROUND OF THE DISCLOSURE

The approach of the electronic information age has greatly promoted development of the semiconductor industry, and upgrading of semiconductor materials is a key point for sustainable development of the electronic information industry. Materials of traditional semiconductor power devices represented by single-crystal silicon gradually reach a development limit and have difficulty meeting new requirements of semiconductor devices for high frequency, high temperature, high power, high energy efficiency, harsh environment resistance, portability, and miniaturization. New materials for the semiconductor devices, such as silicon carbide, gallium nitride, and diamond have become a main development direction of future semiconductor devices due to their excellent properties.

However, the new materials for the semiconductor devices are regarded as difficult-to-machine materials because of high hardness, high brittleness, and stable chemical properties. Ultra-precision polishing technology of the new materials still uses a polishing method of the traditional silicon wafers, that is, a chemical mechanical polishing technology. As a hardness of new wafers made of the new materials for the semiconductor devices is much higher than a hardness of traditional silicon wafers, low processing efficiency, high processing costs, and difficulty in meeting requirements of surface qualities of the new wafers occur. Therefore, in-depth analysis of an interface interaction process between abrasive and the new wafers help to identify an abrasive polishing removal mechanism for the new wafers of the semiconductor devices to then achieve high-efficient ultra-precision non-destructive processing of the new wafers made of the new materials for the semiconductor devices.

At present, a technical solution and a test of an interfacial tribochemical reaction mainly focus on interaction of different materials in a macro-contact system. For example, CN 112147040 A discloses a device for testing an interfacial friction between hydrate monomers and sediments and a method thereof; CN 104677783 A discloses a method for testing $Al_4C_3$ products after a reaction of aluminum and carbon using electro-chemistry, so as to quantitatively identify a reaction degree of aluminum-carbon interfaces; and "Chemical modification of the international frictional properties of vanadium carbide through ethanol adsorption" discloses a method for testing a change of interfacial frictional properties of vanadium carbide under a condition of ethanol adsorption using an atomic force microscope. The problems of the existing testing methods are as follows: (1) studied interface tribochemical reactions all occur under macro conditions so as to have difficulty in analyzing interface friction at atomic levels; (2) Existing testing methods can only test interfacial tribochemical reaction between specific materials and cannot be wildly used; and (3) When the interfacial tribochemical reaction is very weak, the aforementioned methods may fail.

BRIEF SUMMARY OF THE DISCLOSURE

An objective of the present disclosure is to provide a method for testing an interfacial tribochemical reaction between abrasive and a diamond wafer to solve the existing technique deficiencies.

A technical solution of the present disclosure is as follows:

A method for testing an interfacial tribochemical reaction between abrasive and a diamond wafer comprises the follow steps:
(1) coating a layer of active metal abrasive (i.e., active metal abrasive particles) or a layer of metal oxide abrasive (i.e., metal oxide abrasive particles) on a tip surface of a diamond indenter of a nano scratch tester by magnetron sputtering;
(2) installing the diamond indenter with the layer of the active metal abrasive or the layer of the metal oxide abrasive on the nano scratch tester, and scratching a surface of the diamond wafer using the diamond indenter to obtain a scratched diamond wafer; and
(3) putting the scratched diamond wafer on a scanning probe micro Raman spectrometer, and analyzing chemical components of a scratching section of the scratched diamond wafer.

In a preferred embodiment, target materials for the magnetron sputtering comprise iron, cobalt, chromium, or titanium, and the iron, the cobalt, the chromium, or the titanium define the layer of the active metal abrasive.

In a preferred embodiment, target materials for the magnetron sputtering comprise copper, iron, zinc, cobalt, nickel, or manganese, feed reaction gas is oxygen, and the oxygen and the copper, the iron, the zinc, the cobalt, the nickel, or the manganese define the layer of the metal oxide abrasive.

In a preferred embodiment, the magnetron sputtering comprises heating the diamond indenter fixed in a working chamber to 300-600° C., and sputtering for 4-6 minutes.

In a preferred embodiment, a lubricating medium for the scratching is deionized water, and a temperature of the lubricating medium is 40-90° C.

In a preferred embodiment, a temperature for the scratching is 50° C.

In a preferred embodiment, during the scratching: a load of the diamond indenter is 1-30 mN, and a speed of the scratching is 1-10 μm/s.

In a preferred embodiment, a curvature radius of the diamond indenter is 1-50 μm.

In a preferred embodiment, a curvature radius of the diamond indenter is 25 μm.

The present disclosure has the following advantages.

In the present disclosure, the surface of the diamond indenter used in the nano scratch tester is coated with the layer of the active metal abrasive or the metal oxide abrasive with uniform and controllable thickness by the magnetron sputtering, and an interface interaction between the layer of the active metal abrasive or the metal oxide abrasive and the diamond wafer is controlled by a scratch test of the diamond wafer. Chemical components of an interaction section on the surface of diamond wafer are analyzed by the scanning probe micro Raman spectrometer, so as to clarify the interfacial tribochemical reaction between the active metal abrasive or the metal oxide abrasive and the diamond wafer. An operation of the method is simple, and the method has good application prospects in the field of efficient ultra-precision machining of a semiconductor wafer substrate.

DETAILED DESCRIPTION OF THE EMBODIMENTS

The technical solutions of the present disclosure are further described below in combination with the accompanying drawings and embodiments.

Embodiment 1

Figure 1A:
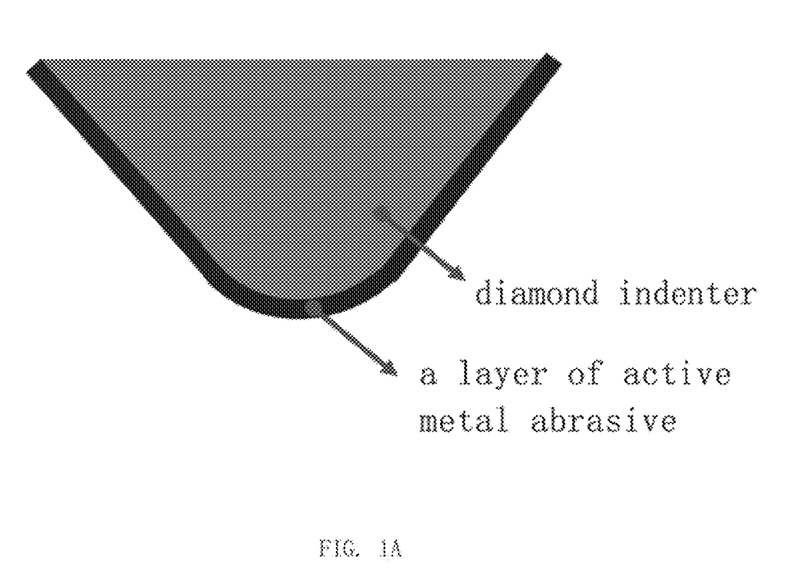
FIG. 1A illustrates a view of a diamond indenter with a layer of active metal abrasive in Embodiment 1 of the present disclosure.
Figure 1B:
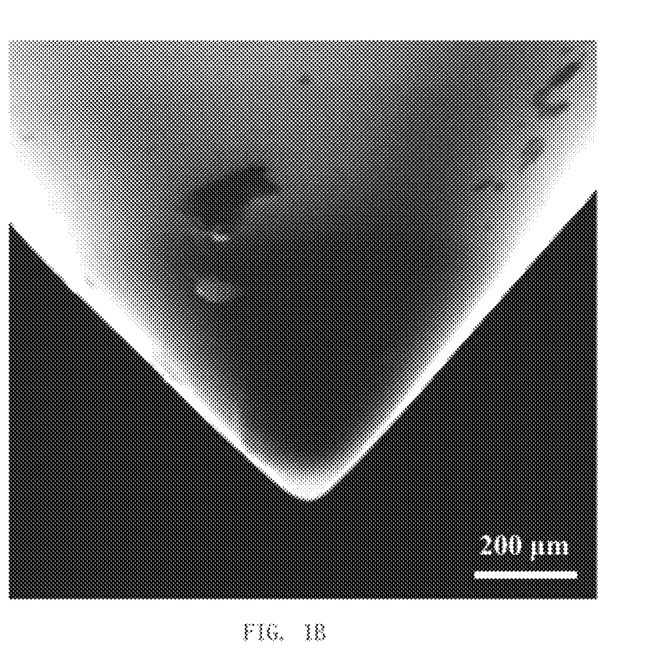
FIG. 1B illustrates a scanning electron microscopic image of the diamond indenter.

(1) A layer of active titanium abrasive is coated on a tip surface of a diamond indenter by magnetron sputtering. In a specific embodiment, monomer titanium with a purity of 99.99% is selected as a target, a diamond indenter with a curvature radius of 25 μm is then fixed in a working chamber, a base pressure of a magnetron sputtering coater is $6.0 \times 10^{-5}$ Pa, and a distance between the target and the diamond indenter is 5 cm. The diamond indenter is then heated, a temperature is controlled to be 450° C., a radio frequency (RF) power is selected to be 100 W, and a sputtering time is 5 minutes. In this way, the layer of the active titanium abrasive with a uniform thickness is successfully coated on a surface of the diamond indenter. Morphology of the diamond indenter coated with a shell of the active titanium abrasive is shown in FIGS. 1A and 1B.

Figure 2:
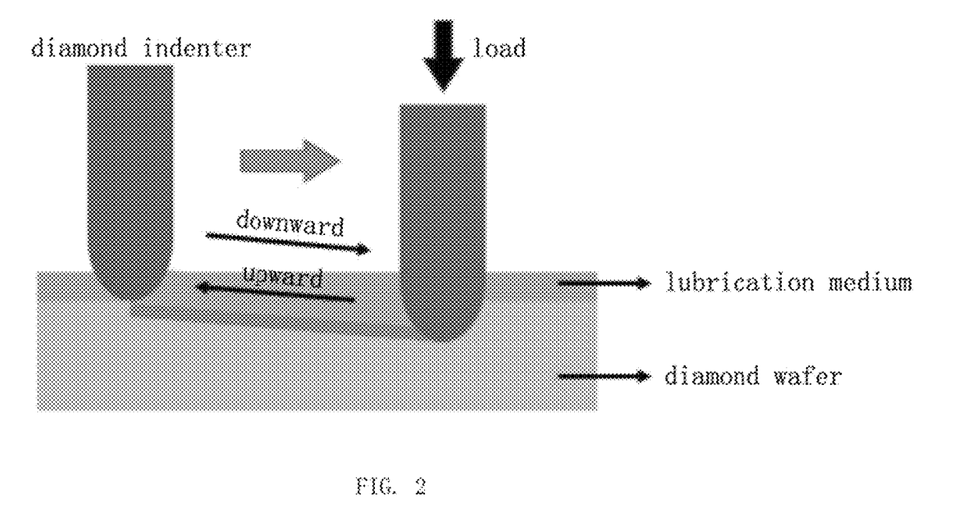
FIG. 2 illustrates a view of scratches on a surface of a diamond wafer caused by active metal abrasive in Embodiment 1 and Comparison Embodiments 1-3 of the present disclosure.

(2) The diamond indenter coated with the shell of the active titanium abrasive obtained in step 1 is installed on a nano scratch tester (KLA, Nano Indenter G200) with a scratching load of 10 mN and a scratching speed of 5 μm/s. A lubrication medium for scratching is neutral deionized water, a pH value is 7, and a temperature of the lubricating medium is 80° C. Referring to FIG. 2, a scratch test is performed on a diamond wafer to obtain a scratched diamond wafer according to the aforementioned parameters.

Figure 3:
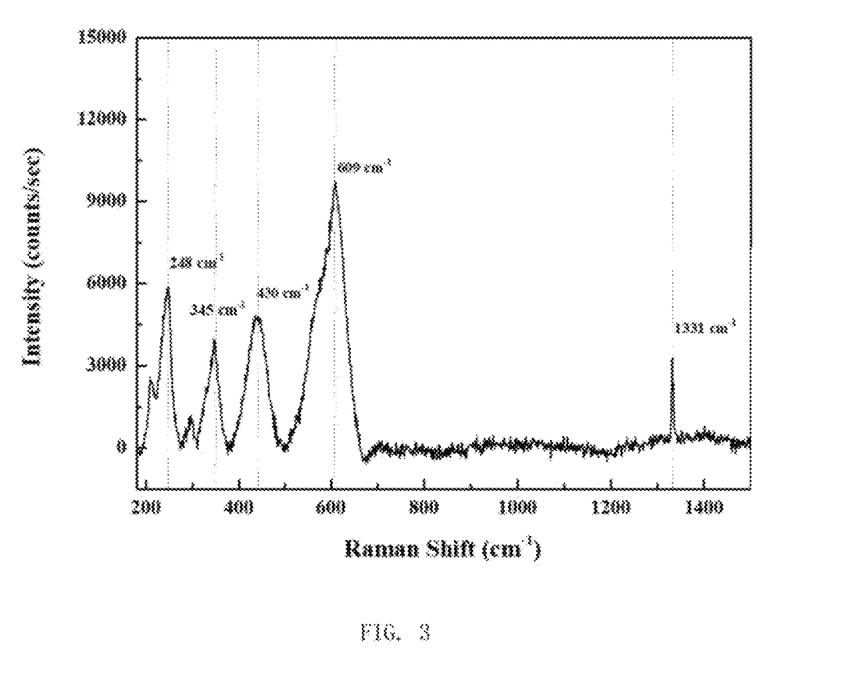
FIG. 3 illustrates testing results of the active metal abrasive at the scratches on the surface of the diamond wafer in Embodiment 1 of the present disclosure.

(3) After the scratch test is complete, the diamond wafer is removed, and chemical components of a scratching section on the surface of the diamond wafer (i.e., the scratched diamond wafer) is analyzed using a scanning probe micro Raman spectrometer (WITEC, a combined device of an atomic force microscope and Raman spectrometer). Referring to FIG. 3, from a Raman spectrum, characteristic peaks are observed at 248 $cm^{-1}$, 345 $cm^{-1}$, 430 $cm^{-1}$, and 609 $cm^{-1}$ in addition to a diamond peak at 1331 $cm^{-1}$, and an existence of TiC is confirmed. That is, a tribochemical reaction induced by mechanical force occurs between the active titanium abrasive and the diamond wafer, and the metal and diamond react to form TiC.

A person of ordinary skill in the art will appreciate that chemical reactions between other metal abrasives (iron, cobalt, and chromium) and the diamond are the same as the chemical reaction between titanium and diamond and achieve same or similar technical effects.

Comparison Embodiment 1

(1) An optical microscope provided by a nano scratch tester (the same as the nano scratch tester in Embodiment 1) is used, and active metal abrasive (i.e., active metal abrasive particles) is adhered to a diamond indenter with a curvature radius of 25 μm through 502 glue. A small amount of the 502 glue is evenly dripped on a glass slide, the glass slide is fixed on a workbench, the workbench moves to enable the small amount of the 502 glue to be stuck to the surface of the diamond indenter, and the workbench then moves to a position of the active metal abrasive. A height of the diamond indenter is adjusted to enable the diamond indenter to be stuck to the active metal abrasive and make contact for 5 seconds, and the diamond indenter is raised up to obtain the diamond indenter stuck with the active metal abrasive. The active metal abrasive are active titanium abrasive with diameters of 50 μm.

Figure 4:
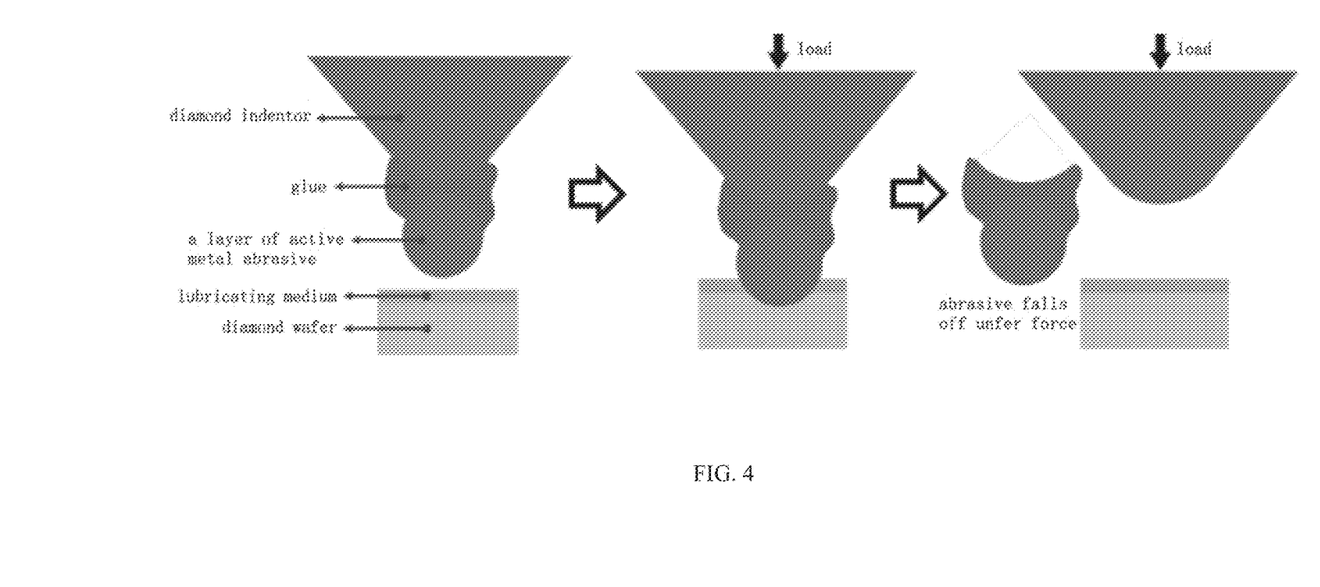
FIG. 4 illustrates scratching results of active metal abrasive under different adhesion states in Comparison Embodiment 1 of the present disclosure.

(2) A diamond wafer is scratched using the diamond indenter stuck with the active metal abrasive obtained in step 1: a scratching load is 10 mN, a scratching speed is 5 μm/second, a lubrication medium for scratching is neutral deionized water, pH value is 7, and a temperature of the lubricating medium is 80° C. Referring to FIG. 2, a scratch test is performed on a diamond wafer according to the aforementioned parameters. However, referring to FIG. 4, during the scratch test, the active metal abrasive stuck to the diamond indenter easily fall off under force, and the scratch test on the diamond wafer cannot be effectively performed. That is, a bonding strength between the active metal abrasive and the diamond indenter is too low when sticking the active metal abrasive using the 502 glue, so it is necessary to find a more reliable connection method with a higher bonding strength. The method for coating the active metal abrasive on the surface of the diamond indenter by the magnetron sputtering in Embodiment 1 is a very reliable and practical way.

Comparison Embodiment 2

(1) Five diamond indenters with curvature radii of 25 μm are prepared, and surfaces of the five diamond indenters are coated with active titanium abrasive (i.e., active titanium abrasive particles) at different sputtering temperatures. Titanium with a purity of 99.99% is selected as a target, and a diamond indenter is then fixed in a working chamber. A base pressure of a magnetron sputtering coater is $6.0 \times 10^{-5}$ Pa, and a distance between the target and the diamond indenter is 5 cm. The five diamond indenters are respectively heated, a temperature is controlled to be 280° C., 300° C., 450° C., 600° C., or 620° C., a radio frequency (RF) power is selected to be 100 W, and a sputtering time is 5 minutes. In this way, the five diamond indenters coated with the active titanium abrasive are obtained under the different sputtering temperatures.

(2) A diamond wafer is scratched using the five diamond indenters sputtered with the active titanium abrasive obtained in the step 1, a scratching load is 10 mN, and a scratching speed is 5 μm/s. A lubrication medium for scratching is neutral deionized water, a pH value is 7, and a temperature of the lubricating medium is 80° C. Referring to FIG. 2, a scratching test is performed on the diamond wafer according to the aforementioned parameters. After the scratching test is complete, when a sputtering temperature is 280° C., a shell of the active titanium abrasive is partially peeled off from a surface of the diamond indenter. An interface bonding strength between the shell of the active titanium abrasive and the diamond indenter is insufficient at this temperature, and the shell of the active titanium abrasive is easily peeled off under force during a scratching process. When the sputtering temperature is 300° C., no shell peeling phenomenon is found on the surface of the diamond indenter, so this temperature is a lower limit of the sputtering temperature. When the sputtering temperature is 450° C. and 600° C., no shell peeling phenomenon is found on the surface of the diamond indenter, so interface binding strength between the shell and the diamond indenter is good. When the sputtering temperature is 620° C., a large area of shell peeling phenomenon is found on the surface of the diamond indenter. That is, diamonds will be thermally damaged at high temperatures (more than 600° C.), and the interface bonding strength between the surface of the diamond indenter and the shell is reduced. Through the several experiments, it is found that 300-600° C. is an appropriate temperature range for sputtering the shell of the active titanium abrasive to the diamond indenter.

Comparison Embodiment 3

(1) Five diamond indenters with curvature radii of 25 μm are prepared, and surfaces of the five diamond indenters are coated with active titanium abrasive (i.e., active titanium abrasive particles) at a same sputtering temperature. Titanium with a purity of 99.99% is selected as a target, and a diamond indenter is then fixed in a working chamber. A base pressure of a magnetron sputtering coater is $6.0 \times 10^{-5}$ Pa, and a distance between the target and the diamond indenter is 5 cm. The five diamond indenters are then heated, a temperature is controlled to be 450° C., a radio frequency (RF) power is selected to be 100 W, and a sputtering time is 5 minutes. In this way, the five diamond indenters sputtered with the active titanium abrasive are obtained under the same sputtering temperatures.

(2) A diamond wafer is scratched using the five identical diamond indenters sputtered with the active titanium abrasive obtained in the step 1, a scratching load is 10 mN, and a scratching speed is 5 μm/s. A lubrication medium (e.g., a lubrication liquid) for scratching is neutral deionized water, a pH value is 7, and a temperature of the lubricating medium is respectively 35° C., 40° C., 50° C., 90° C., or 95° C. Referring to FIG. 2, a scratching test is performed on the diamond wafer according to the aforementioned parameters. When the temperature of the lubricating medium is 35° C., only a peak position of diamond (1331 $cm^{-1}$) is found in a Raman spectrum of a scratch section, so a chemical reaction between the active titanium abrasive and the diamond has difficulty occurring at this temperature of the lubricating medium. When the temperature of the lubricating medium is 40° C., weak TiC signals (248, 345, 430, 609 $cm^{-1}$) can be detected in the Raman spectrum of the scratch section, so active titanium can react with diamond at this temperature, but reaction activity is relatively low. When the temperature of the lubricating medium is 50° C. or 90° C., an obvious TiC characteristic peak is shown in the Raman spectrum of the scratch section. When the temperature of the lubricating medium is 95° C., the lubricating medium is easily volatilized, resulting in certain potential safety risks. Through the several experiments, it is found that 40-90° C. is an appropriate temperature range for the scratching for the lubricating medium.

Embodiment 2

Figure 5A:
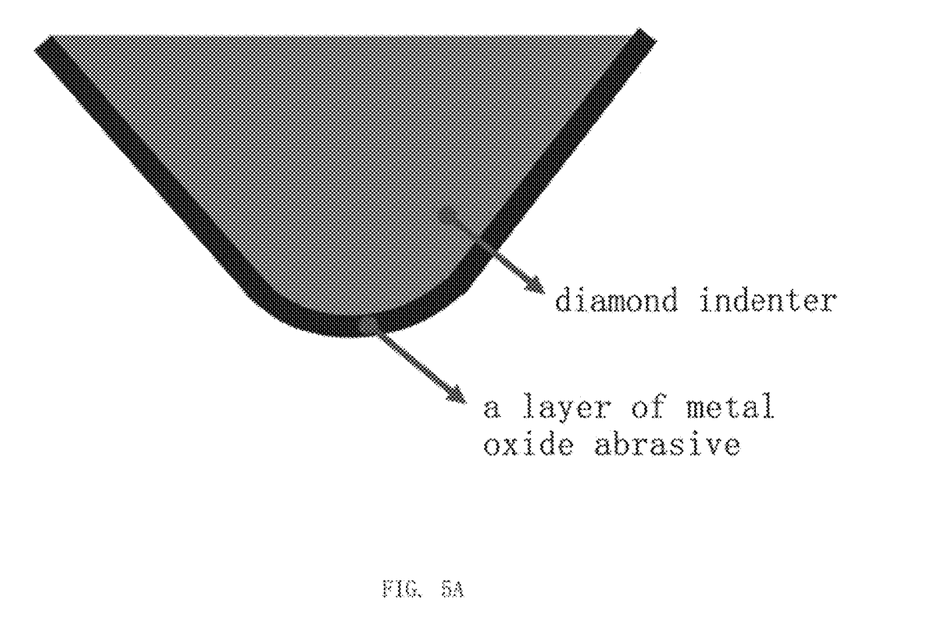
FIG. 5A illustrates a view of a diamond indenter with a layer of metal oxide abrasive in Embodiment 1 of the present disclosure.
Figure 5B:
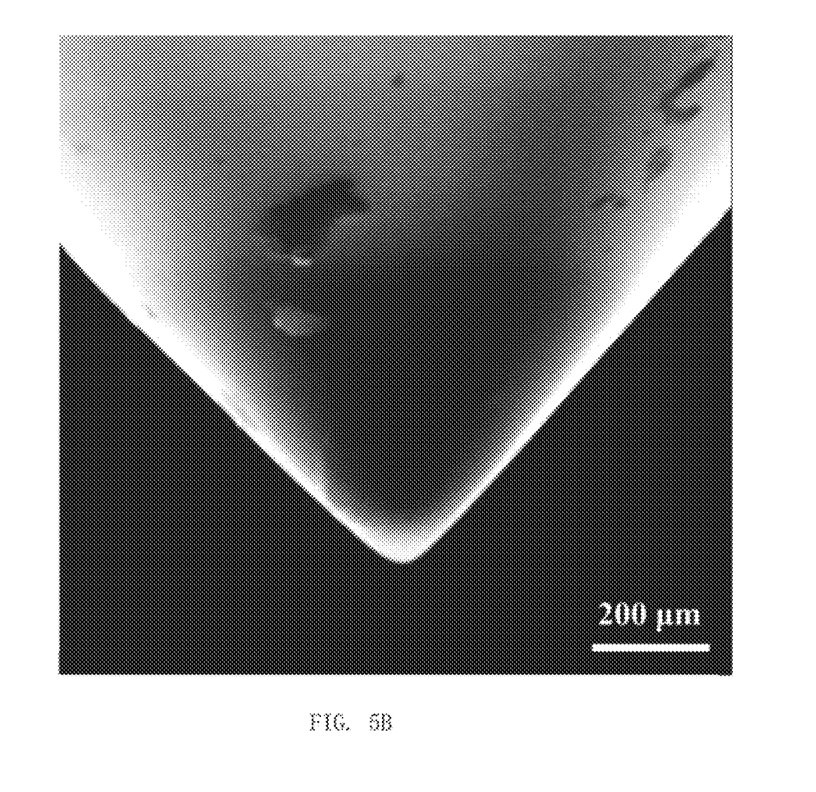
FIG. 5B illustrates a scanning electron microscopic image of the diamond indenter.

(1) A layer of copper oxide abrasive (i.e., copper oxide abrasive particles) is coated on a tip surface of a diamond indenter by magnetron sputtering. In a specific embodiment, monomer copper with a purity of 99.99% is selected as a target, a diamond indenter with a curvature radius of 25 μm is then fixed in a working chamber, a base pressure of a magnetron sputtering coater is $6.0 \times 10^{-5}$ Pa, feed reaction gas is oxygen with a purity of 99.99%, a working pressure is 0.5 Pa, and a distance between the target and the diamond indenter is 5 cm. The diamond indenter is then heated, a temperature is controlled to be 450° C., a radio frequency (RF) power is selected to be 100 W, and a sputtering time is 5 minutes. In this way, the layer of the copper oxide abrasive with a uniform thickness is successfully coated on a surface of the diamond indenter. Morphology of the diamond indenter coated with a shell of the copper oxide abrasive is shown in FIGS. 5A and 5B.

Figure 6:
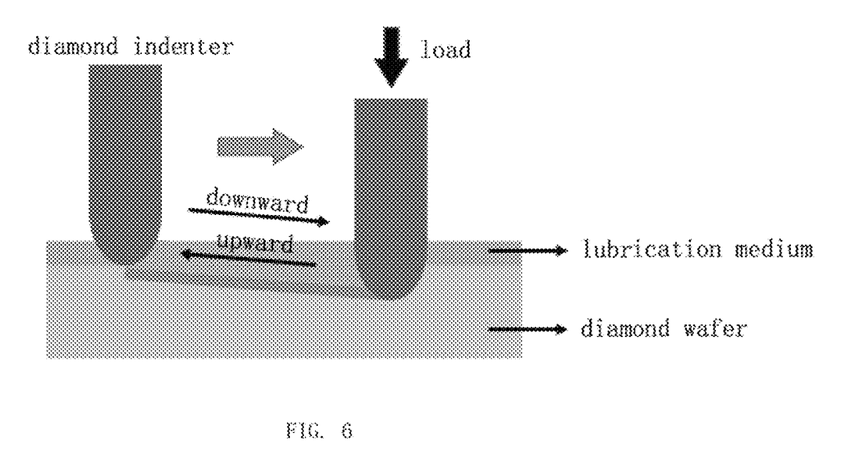
FIG. 6 illustrates a view of scratches on a surface of a diamond wafer caused by the metal oxide abrasive in Embodiment 1 and Comparison Embodiments 1-3 of the present disclosure.

(2) The diamond indenter coated with the shell of the copper oxide abrasive obtained in step 1 is installed on a nano scratch tester (KLA, Nano Indenter G200) with a scratching load of 10 mN and a scratching speed of 5 μm/s. A lubrication medium for scratching is neutral deionized water, a pH value is 7, and a temperature of the lubricating medium is 80° C. Referring to FIG. 6, a scratch test is performed on a diamond wafer to obtain a scratched diamond wafer according to the aforementioned parameters.

Figure 7:
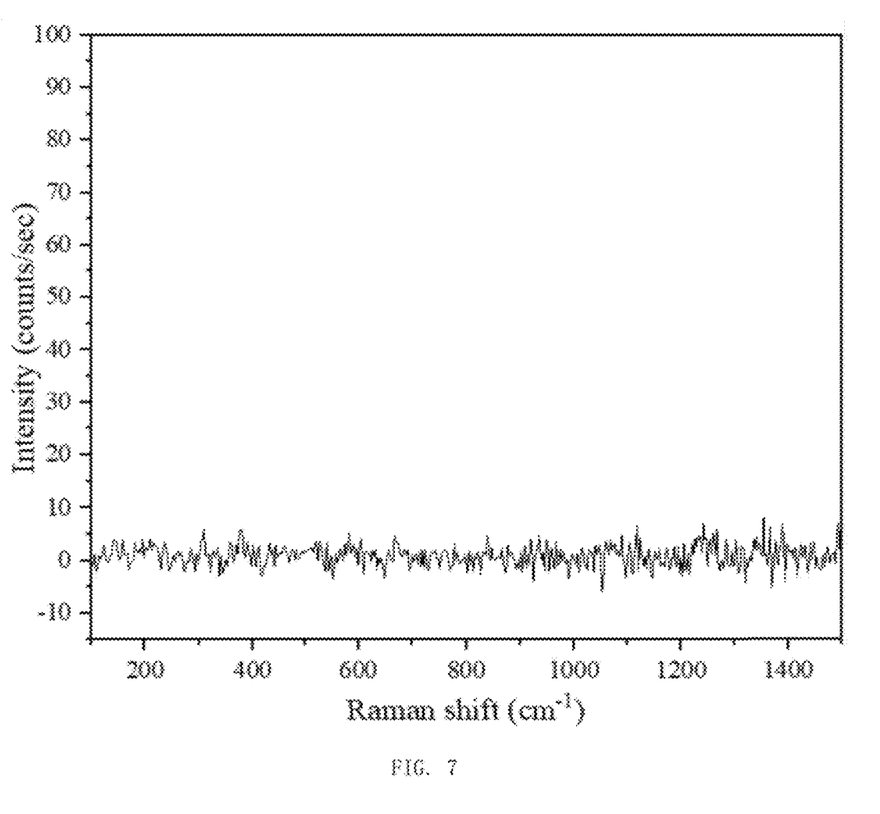
FIG. 7 illustrates a view of Raman testing results of copper oxide abrasive at the scratches on the surface of the diamond wafer in Embodiment 1 of the present disclosure.
Figure 8:
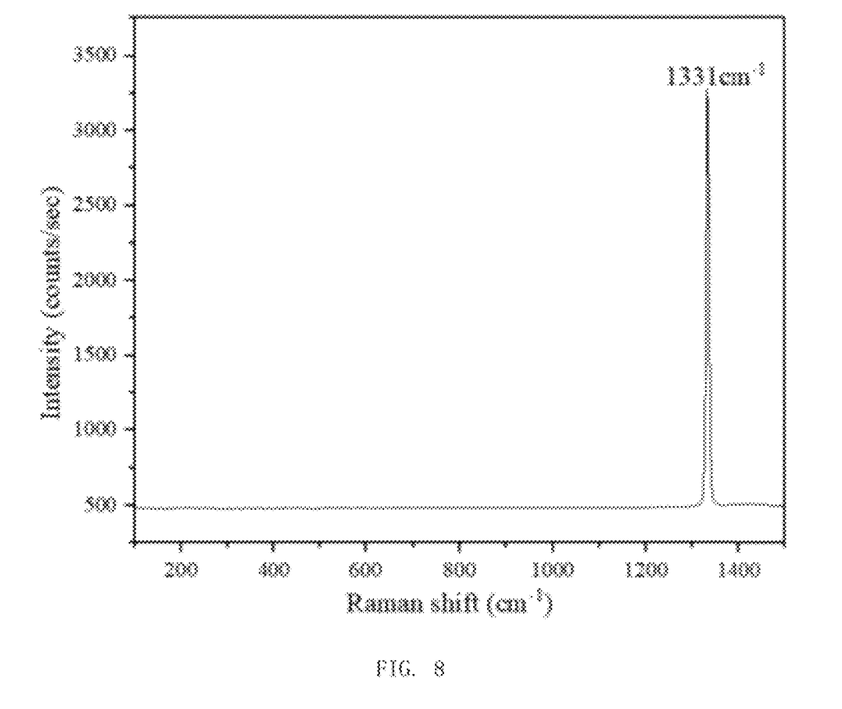
FIG. 8 illustrates a view of Raman testing results of copper oxide abrasive at non-scratching positions on the surface of the diamond wafer in Embodiment 1 of the present disclosure.
Figure 9:
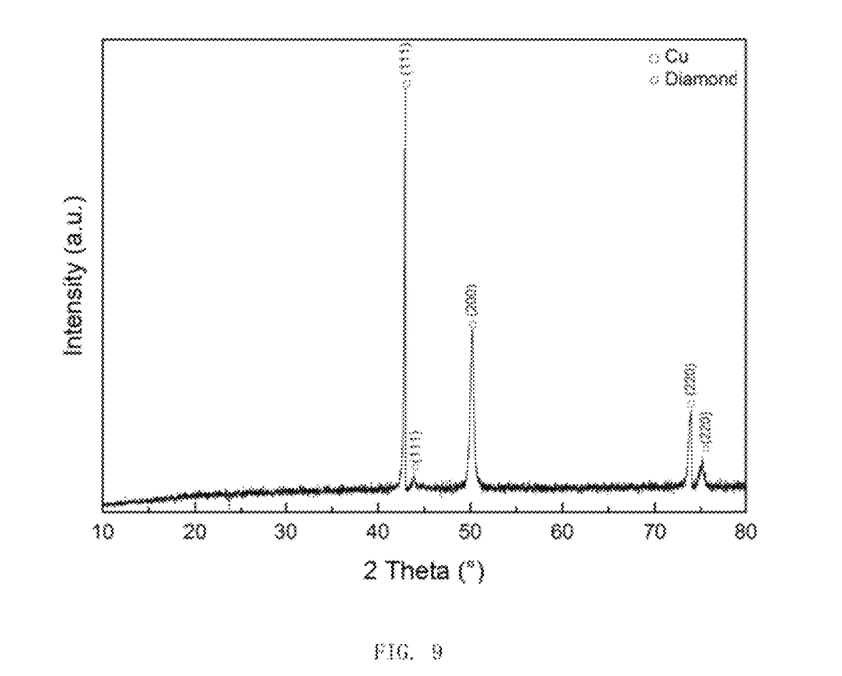
FIG. 9 illustrates X-ray diffraction (XRD) testing results at the scratches on the diamond wafer in Embodiment 1 of the present disclosure.

(3) After the scratch test is complete, the diamond wafer is removed, and chemical components of a scratching section and a non-scratching section on the surface of the diamond wafer (i.e., the scratched diamond wafer) is analyzed using a scanning probe micro Raman spectrometer (WITEC, a combined device of an atomic force microscope and Raman spectrometer). Referring to FIGS. 7 and 8, from a Raman spectrum, no characteristic peak is observed at the scratching section, while an obvious diamond peak (1331 $cm^{-1}$) is observed at the non-scratching section. That is, a tribochemical reaction induced by mechanical force occurs between the copper oxide abrasive and the diamond wafer, a replacement reaction between copper oxide and diamond occurs, monomer copper produced by the replacement reaction is attached to the scratching section, and a phenomenon that monomer metal does not have Raman characteristic peaks and will cover up other signal peaks is appreciated by a person skilled in the art. Further, referring to FIG. 9, chemical substances in the scratching section are analyzed using X-ray diffraction (XRD), obvious signal peaks of the monomer copper and the diamond are detected, and an accuracy of Raman analysis results is verified.

(4) A person skilled in the art will appreciate that other oxide abrasives (iron oxide, zinc oxide, cobalt oxide, nickel oxide, or manganese oxide) have a reaction with the diamond as the replacement reaction between the copper oxide and the diamond, teat results of the Raman spectrum are similar, and same or similar technical effects are achieved.

Comparison Embodiment 4

(1) An optical microscope provided by a nano scratch tester (the same as the nano scratch tester in Embodiment 1) is used, copper oxide abrasive (i.e., copper oxide abrasive particles) is adhered to a diamond indenter with a curvature radius of 25 μm through 502 glue. A small amount of the 502 glue is evenly dripped on a glass slide, the glass slide is fixed on a workbench, the workbench moves to enable the small amount of the 502 glue to be stuck to the surface of the diamond indenter, and the workbench then moves to a position of the copper oxide abrasive. A height of the diamond indenter is adjusted to enable the diamond indenter to be stuck to the copper oxide abrasive and contacted for 5 seconds. The diamond indenter is raised up to obtain the diamond indenter stuck with the copper oxide abrasive. Diameters of the copper oxide abrasive are 50 μm.

Figure 10:
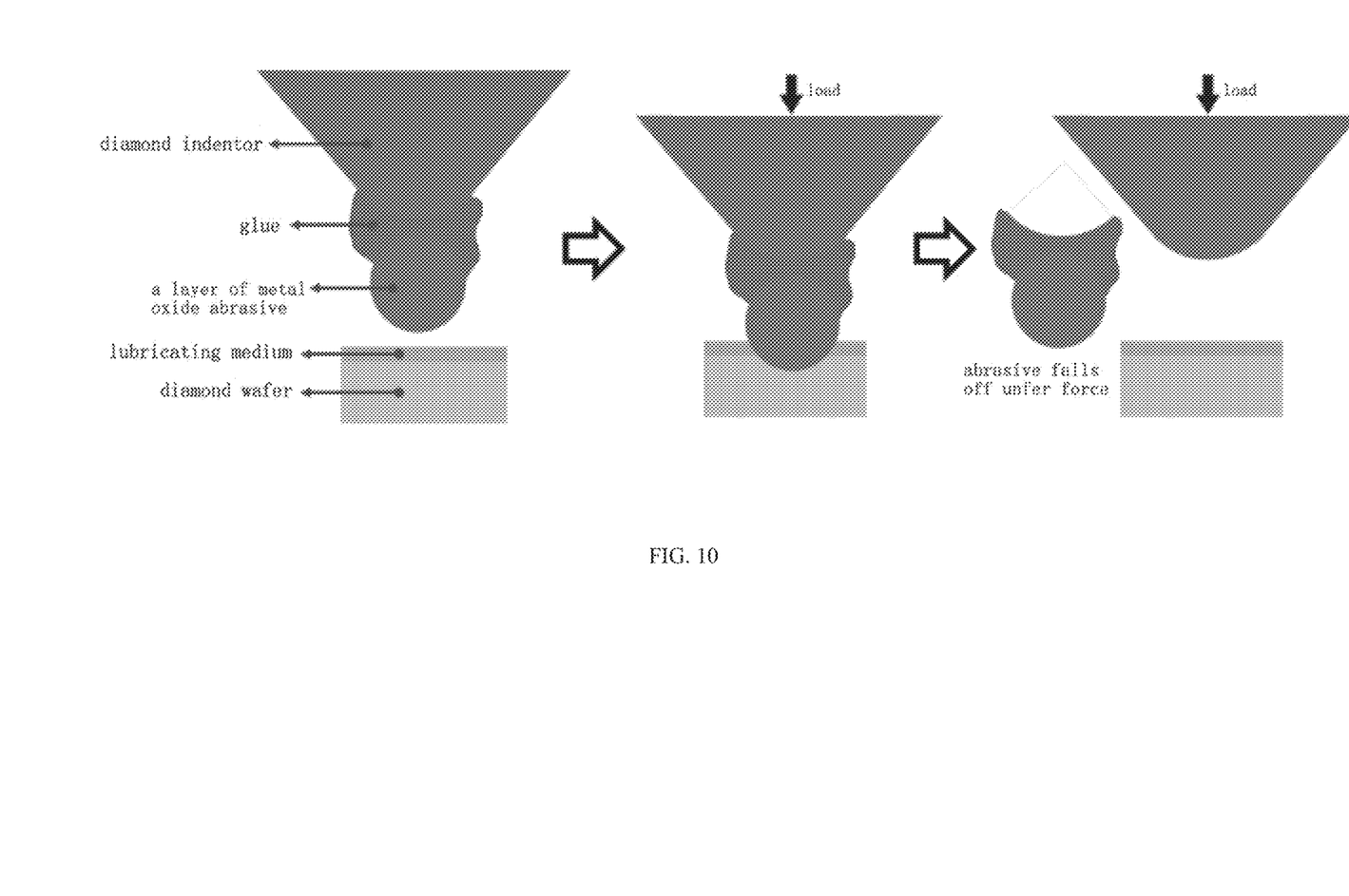
FIG. 10 illustrates scratching results of the metal oxide abrasive under different adhesion states in Comparison Embodiment 1 of the present disclosure.

(2) A diamond wafer is scratched using the diamond indenter stuck with the copper oxide abrasive obtained in step 1: a scratching load is 10 mN, a scratching speed is 5 μm/second, a lubrication medium for scratching is neutral deionized water, pH value is 7, and a temperature of the lubricating medium is 80° C. Referring to FIG. 6, a scratch test is performed on a diamond wafer according to the aforementioned parameters. However, referring to FIG. 10, during the scratch test, the copper oxide abrasive stuck to the diamond indenter easily fall off under force, and the scratch test on the diamond wafer cannot be effectively performed. That is, a bonding strength between the copper oxide abrasive and the diamond indenter is too low when sticking the copper oxide abrasive using the 502 glue, so it is necessary to find a more reliable connection method with a higher bonding strength. The method for coating the copper oxide abrasive on the surface of the diamond indenter by the magnetron sputtering in Embodiment 2 is a very reliable and practical way.

Comparison Embodiment 5

(1) Five diamond indenters with curvature radii of 25 μm are prepared, and surfaces of the five diamond indenters are coated with copper oxide abrasive (i.e., copper oxide abrasive particles) at different sputtering temperatures. Copper with a purity of 99.99% is selected as a target, and a diamond indenter is then fixed in a working chamber. A base pressure of a magnetron sputtering coater is $6.0\times10^{-5}$ Pa, feed reaction gas is oxygen with a purity of 99.99%, a working pressure is 0.5 Pa, and a distance between the target and the diamond indenter is 5 cm. The five diamond indenters are respectively heated, a temperature is controlled to be 280° C., 300° C., 450° C., 600° C., or 620° C., a radio frequency (RF) power is selected to be 100 W, and a sputtering time is 5 minutes. In this way, the five diamond indenters coated with the copper oxide abrasive are obtained under the different sputtering temperatures.

(2) A diamond wafer is scratched using the five diamond indenters coated with the copper oxide abrasive obtained in the step 1, a scratching load is 10 mN, and a scratching speed is 5 μm/s. A lubrication medium for scratching is neutral deionized water, a pH value is 7, and a temperature of the lubricating medium is 80° C. Referring to FIG. 6, a scratching test is performed on the diamond wafer according to the aforementioned parameters. After the scratching test is complete, when a sputtering temperature is 280° C., a shell of the copper oxide abrasive is partially peeled off from a surface of the diamond indenter. An interface bonding strength between the shell of the copper oxide abrasive and the diamond indenter is insufficient at this temperature, and the shell of the copper oxide abrasive is easily peeled off under force during a scratching process. When the sputtering temperature is 300° C., no shell peeling phenomenon is found on the surface of the diamond indenter, so this temperature is a lower limit of the sputtering temperature. When the sputtering temperature is 450° C. and 600° C., no shell peeling phenomenon is found on the surface of the diamond indenter, so interface binding strength between the shell and the diamond indenter is good. When the sputtering temperature is 620° C., a large area of shell peeling phenomenon is found on the surface of the diamond indenter. That is, diamonds will be thermally damaged at high temperatures (more than 600° C.), and the interface bonding strength between the surface of the diamond indenter and the shell is reduced. Through the several experiments, it is found that 300-600° C. is an appropriate temperature range for sputtering the shell of the copper oxide abrasive to the diamond indenter.

Comparison Embodiment 6

(1) Five diamond indenters with curvature radii of 25 μm are prepared, and surfaces of the five diamond indenters are coated with copper oxide abrasive (i.e., copper oxide abrasive particles) at a same sputtering temperature. Copper with a purity of 99.99% is selected as a target, and a diamond indenter is then fixed in a working chamber. A base pressure of a magnetron sputtering coater is $6.0\times10^{-5}$ Pa, feed reaction gas is oxygen with a purity of 99.99%, a working pressure is 0.5 Pa, and a distance between the target and the diamond indenter is 5 cm. The five diamond indenters are then heated, a temperature is controlled to be 450° C., a radio frequency (RF) power is selected to be 100 W, and a sputtering time is 5 minutes. In this way, the five diamond indenters coated with the copper oxide abrasive are obtained under the same sputtering temperatures.

(2) A diamond wafer is scratched using the five identical diamond indenters coated with the copper oxide abrasive obtained in the step 1, a scratching load is 10 mN, and a scratching speed is 5 μm/s. A lubrication medium (e.g., a lubrication liquid) for scratching is neutral deionized water, a pH value is 7, and a temperature of the lubricating medium is respectively 35° C., 40° C., 50° C., 90° C., or 95° C. Referring to FIG. 6, a scratching test is performed on the diamond wafer according to the aforementioned parameters. When the temperature of the lubricating medium is 35° C., obvious peak position of diamond (1331 cm$^{-1}$) is found in a Raman spectrum of a scratch section, so a replacement reaction between the copper oxide abrasive and the diamond does not occur at this temperature. When the temperature of the lubricating medium is 40° C., 50° C., and 90° C., no obvious characteristic peak is shown in the Raman spectrum of the scratch section, and an obvious diamond characteristic peak is shown in Raman spectrum of non-scratch section. That is, a replacement reaction between copper oxide and the diamond occurs, and copper generated by the replacement reaction is attached to a diamond surface in the scratch section, so there is no obvious signal in the Raman spectrum. When the temperature of the lubricating medium is 95° C., the lubricating medium is easily volatilized, resulting in certain potential safety risks. Through the several experiments, it is found that 40-90° C. is an appropriate temperature range for the scratching for the lubricating medium.

The aforementioned embodiments are merely some embodiments of the present disclosure, and the scope of the disclosure is not limited thereto. Thus, it is intended that the present disclosure cover any modifications and variations provided they are made without departing from the appended claims and the specification of the present disclosure.

What is claimed is:

1. A method for testing an interfacial tribochemical reaction between abrasive and a diamond wafer, comprising:
   (1) coating a layer of active metal abrasive or a layer of metal oxide abrasive on a tip surface of a diamond indenter of a nano scratch tester by magnetron sputtering;
   (2) installing the diamond indenter with the layer of the active metal abrasive or the layer of the metal oxide abrasive on the nano scratch tester, scratching a surface of the diamond wafer using the diamond indenter to enable the surface of the diamond wafer to react with the active metal abrasive or the metal oxide abrasive, and obtaining a scratched diamond wafer, wherein:
      a lubricating medium for the scratching is deionized water, and
      a temperature of the lubricating medium is 40-90° C.; and
   (3) putting the scratched diamond wafer on a scanning probe micro Raman spectrometer, and analyzing chemical components of a scratching section of the scratched diamond wafer.

2. The method according to claim 1, wherein:
   target materials for the magnetron sputtering comprise at least one of iron, cobalt, chromium, or titanium, and
   the at least one of the iron, the cobalt, the chromium, or the titanium define the layer of the active metal abrasive.

3. The method according to claim 2, wherein:
   the magnetron sputtering comprises heating the diamond indenter fixed in a working chamber to 300-600° C., and
   sputtering for 4-6 minutes.

4. The method according to claim 3, wherein a temperature for the scratching is 50° C.

5. The method according to claim 2, wherein the layer of the active metal abrasive consists of the at least one of the iron, the cobalt, the chromium, or the titanium.

6. The method according to claim 3, wherein:
   during the scratching:
      a load of the diamond indenter is 1-30 mN, and
      a speed of the scratching is 1-10 μm/s.

7. The method according to claim 1, wherein:
   target materials for the magnetron sputtering comprise at least one of copper, iron, zinc, cobalt, nickel, or manganese,
   feed reaction gas is oxygen, and
   the oxygen and the at least one of the copper, the iron, the zinc, the cobalt, the nickel, or the manganese define the layer of the metal oxide abrasive.

8. The method according to claim 7, wherein:
   the magnetron sputtering comprises heating the diamond indenter fixed in a working chamber to 300-600° C., and
   sputtering for 4-6 minutes.

9. The method according to claim 8, wherein a temperature for the scratching is 50° C.

10. The method according to claim 7, wherein the layer of the metal oxide abrasive consists of at least one of copper oxide, iron oxide, zinc oxide, cobalt oxide, nickel oxide, or manganese oxide.

11. The method according to claim 8, wherein:
    during the scratching:
       a load of the diamond indenter is 1-30 mN, and
       a speed of the scratching is 1-10 μm/s.

12. The method according to claim 1, wherein a curvature radius of the diamond indenter is 1-50 μm.

13. The method according to claim 1, wherein a curvature radius of the diamond indenter is 25 μm.

14. The method according to claim 1, wherein the scratching the surface of the diamond wafer using the diamond indenter to enable the surface of the diamond wafer to react with the active metal abrasive or the metal oxide abrasive comprises scratching the surface of the diamond wafer using the diamond indenter with the layer of the active metal abrasive or the layer of the metal oxide abrasive and deionized water having a temperature of 40-90° C.

15. A method for testing an interfacial tribochemical reaction between abrasive and a diamond wafer, comprising:
    (1) coating a layer of active metal abrasive or a layer of metal oxide abrasive on a tip surface of a diamond indenter of a nano scratch tester by magnetron sputtering;
    (2) installing the diamond indenter with the layer of the active metal abrasive or the layer of the metal oxide abrasive on the nano scratch tester, and scratching a surface of the diamond wafer using the diamond indenter with the layer of the active metal abrasive or the layer of the metal oxide abrasive and deionized water having a temperature of 40-90° C. to enable the surface of the diamond wafer to react with the active metal abrasive or the metal oxide abrasive, and obtaining a scratched diamond wafer; and
    (3) putting the scratched diamond wafer on a scanning probe micro Raman spectrometer, and analyzing chemical components of a scratching section of the scratched diamond wafer.

* * * * *